June 21, 1955  P. L. DONOVAN  2,711,062
DRAG HARROW
Filed Sept. 27, 1951  2 Sheets-Sheet 1
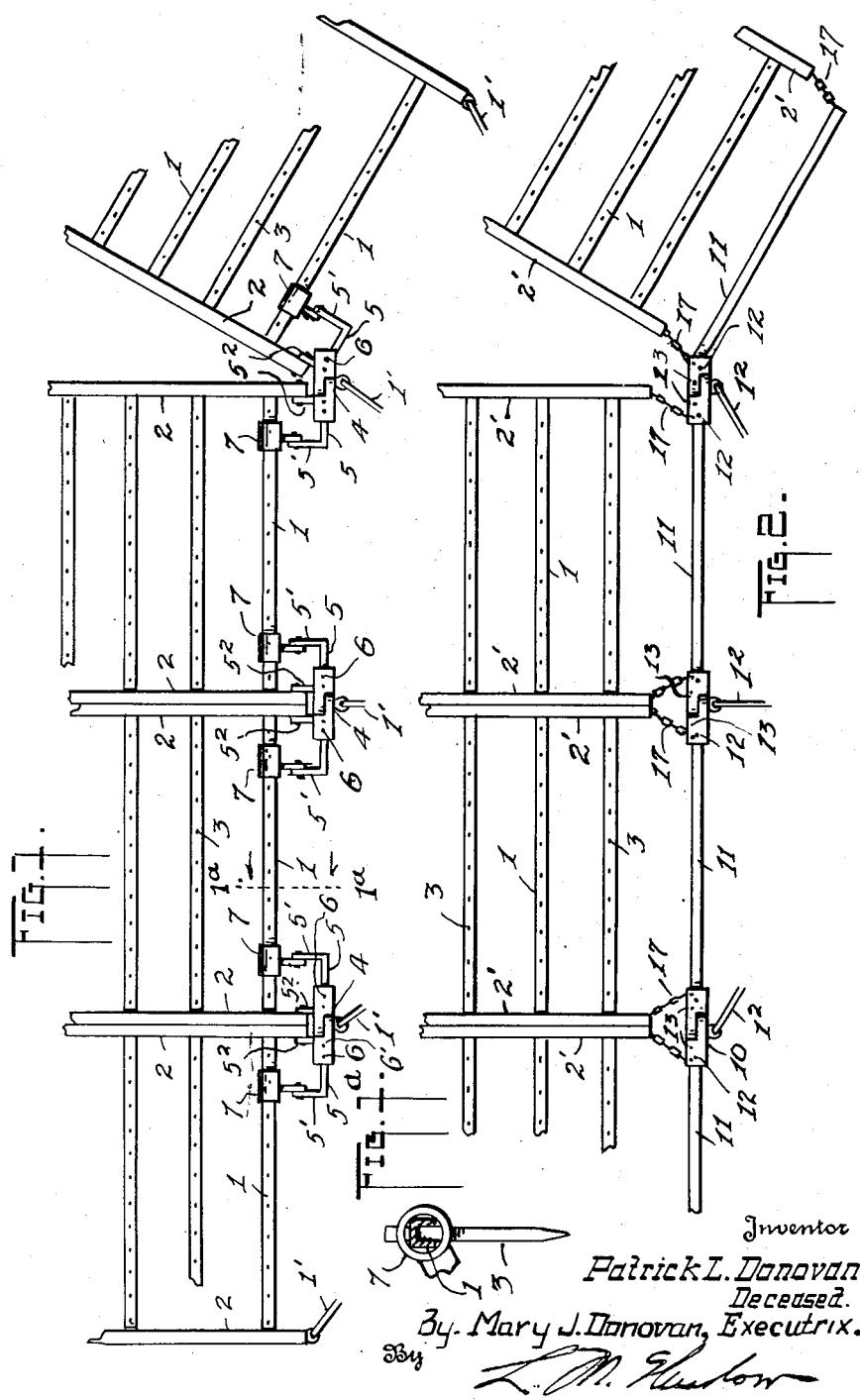
Inventor
Patrick L. Donovan,
Deceased.
By Mary J. Donovan, Executrix.
ATTORNEY

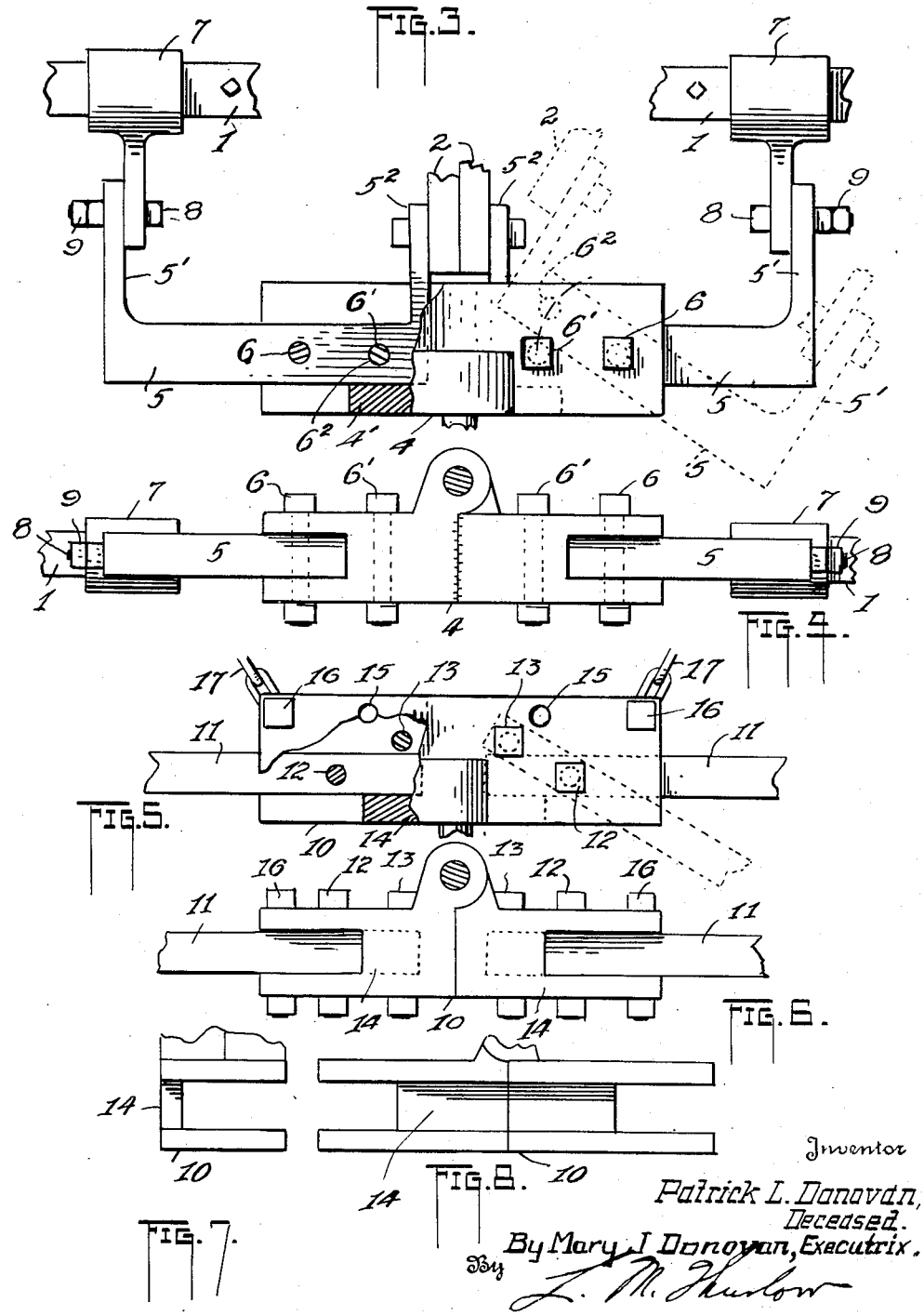

United States Patent Office 2,711,062
Patented June 21, 1955

2,711,062
DRAG HARROW

Patrick L. Donovan, deceased, late of Peoria, Ill., by Mary J. Donovan, executrix, Peoria, Ill.

Application September 27, 1951, Serial No. 248,556

6 Claims. (Cl. 55—84)

This invention pertains to improvements in drag harrows. More particularly the invention has to do with the structure and arrangement of certain draft attachments somewhat of the type forming the subject of the patent of Patrick L. Donovan for Multiple Harrow Draft Device, No. 2,582,750, dated January 15, 1952, though having advantages in respect to flexibility of parts of the whole believed to be novel.

An object of the invention is to furnish a draft attachment for connection with a harrow section, part of which attachment is swingable with respect to a companion portion whereby the said harrow section may more freely move in making turns in the field.

Another object lies in providing a draft attachment for a harrow section which will allow the said harrow section to have greater free vertical movement in the field than heretofore permitted.

Still another object is to provide a draft attachment for connection with harrow sections wherein part thereof to which a harrow section is connected may swing in a horizontal plane in the field and yet, when desired, may be limited in that movement, or which, on occasion, may be secured in a fixed position with another part thereof.

Other objects and advantages will appear as the structures and purposes are brought out in the following specification, aided by the accompanying drawings wherein:

Figure 1 is a plan of a plurality of harrow sections wherewith the draft attachments therefor are shown connected thereto.

Figure 1a is a side elevation of parts shown in Figure 1, much enlarged, produced on line 1a—1a thereof.

Figure 2 is a plan of a plurality of harrow sections with which draft attachments are also shown, a draft bar being illustrated between said harrow sections and said attachments.

Figure 3 is a plan of a draft attachment with part shown broken away to show structures.

Figure 4 is a front elevation of the draft attachment shown in Fig. 3.

Figure 5 is a plan of a draft attachment of a slightly different form but having substantially the same advantages as the form in Figure 3.

Figure 6 is a front elevation of the structure shown in Fig. 5.

Figures 7 and 8 are respectively an end elevation and rear elevation of the body of the draft attachments shown in both Figures 3 and 6.

In the figures of the drawings, the character 1 denotes the tooth-bars of a harrow, while 2 denotes members to which said tooth-bars are connected, the teeth or spikes of the tooth-bars being indicated at 3.

In Figures 1 and 3 there is illustrated a draft attachment body 4 having two forked hingedly connected portions foldable one upon the other in a vertical plane. Within each portion is a U-shaped member 5 in this particular instance, each member at substantially its middle length being swingable about a bolt 6 as a pivot point.

To an arm 5' of each U-member is pivotally connected a tubular part 7 through each of which extends a foremost or leading tooth-bar 1 free to have rocking movement in the travel of the harrow over the field.

In Figure 3 it is noted that the pivot for connecting the part 7 with the U-member 5 may be a bolt 8 which at one end has a pair of nuts 9, one of which is a locknut. This arrangement permits parts 7 to rock vertically with respect to the U-member 5. The parts 5 and 7 are thus juxtaposed rigid connections pivotally mounted with respect to each other.

The other arm $5^2$ of each U-member has pivotal connection in any suitable manner with a bar 2 of an adjacent harrow section so as to be movable vertically while the harrow is in use. The two arms $5^2$ with their respective bars 2 will lie one above the other when the harrow sections are folded.

Each draft attachment 4 has connected therewith in any usual, or well known manner, a draft chain, or rod 1' as shown in Figure 1, for example, for attachment to a power source not shown.

Besides the pivot-bolt 6 already referred to, a second bolt 6' may be employed to extend through a hole $6^2$ in the member 5 by means of which the latter may be secured with respect to the body 4. By this arrangement, it will be seen that, if desired, any two adjoining harrow sections may be prevented from swing relative to each other in their own planes.

While said bolt 6', as stated, prevents pivotal movement of the member 5 in one direction, a wall 4' of the body 4 prevents rotation of said member 5 in the opposite direction, this relation being in effect whether the equipment is stationary or in operation.

Figures 5 and 6 show a structure similar to that already described, and shown in respect to the harrow sections in Figure 1. However, in this instance, the two part hinged body denoted at 10 receives into each end thereof a draftbar section 11, each section receiving therethrough a bolt 12 about which any such section may pivot as shown in broken lines in Figure 5. Also, a bolt 13 may extend through each end of the body 10 at a position at one side of the section 11 to thus prevent pivotal movement of such section in one direction within the said body 10, said section being prevented from pivoting in the other direction by a wall portion 14 as part of said body, see Figures 7 and 8.

Again, in Figure 5, a hole 15 may extend through each end of the body 10 and in which the bolt 13 may be placed when removed from its position just described. This shifting of the said bolt from one position to the other provides for a greater or less swing of the bar 11 in one direction. Naturally, too, the removal of the bolt entirely from the body will permit the bar to swing widely with no hindrance whatever.

The body 10 receives therethrough at opposite ends a bolt 16 for securing one end of a chain 17, for example, whose other end is attached to one of the transverse bars 2' of the harrow as in Figure 2.

As in the patent above identified, the harrow sections can be folded over, one upon another for transportation purposes, this being permitted by the hinged portions of the bodies 4 of Figure 1 and bodies 10 of Figure 2. Also, due to the fact that the member 5 of Figure 1, and the draft-bar members 11 of Figure 2 are pivoted upon the bodies 4 and 10, respectively, the harrow sections may swing with respect to each other as the whole assembly turns in the field.

The structures shown in Figures 3 and 5, and already described, are in themselves identical in respect to manner of use in the field, as may be seen, in that each provides for more or less pivotal action of the parts thereof relatively, as well as fixing said parts in respect to each other. The only difference in the two forms is merely that of providing for the two different manners of attachment to the harrow sections.

In harrowing practice it is desirable that there be a flexibility of parts. In the present instance, the draft attachment in Figure 3 is hinged to move vertically with respect to the bar 2 of the harrow sections, and may have a like free movement as the tooth bars 1 rock within the tubular portions 7, the latter, in turn, pivoting upon the bolt 8 carried by the member 5 of said attachment.

Again, in Figures 2 and 5, the attachment 10 is loosely attached by the chains 17 to the bars 2' of the harrow sections so that the said sections are free to move vertically, the continuous draftbar made up of the parts 11 being permitted free action due to said chains.

It is noted that the draft attachment 1² and the chain 17 of the arrangement shown in Figure 2 have control of the outer extremity of an end harrow section while in Figure 1, the control of a like section is through the draft attachment 1' and the U-member 5 together with the tubular part 7, the latter structure merely giving a more compact arrangement.

Heretofore, a draft bar section such as one of the parts 11 herein named has been secured in a fixed position to each of two pivotally connected portions of a draft member such portions being swingable with respect to each other during work in the field.

In the present instance, the draft members 4, or their counterparts 10, are not swingable relative to each other in a plane paralleling the direction of advance in the field. Instead, the arms 5 of Figures 1 and 3 and the section 11 of Figures 5 and 6 are pivoted each on a draft member whose parts permit only the folding over of one part upon another, the movement of said arms 5 as well as the draft bar sections 11 about their pivots being independent of the pivotal relation between said draft members. The draft member 4 also provides for limiting such movement of the parts 5 and 11, while also providing for fixing said section with respect to such draft members. By reason of this difference, great flexibility is afforded as has been demonstrated in practice.

Through the use of the bolts 6' of Figure 1, it is clear that all of the U-members may be fixed relative to the portions 4, so that all four harrow sections can be maintained in line with each other and in fixed relation which, at times, may be found desirable. Likewise, when the bolts 13 of Figure 2 are employed, the four sections of the draft bar 11 will be held in line with each other, the harrow sections in any turning movement in the field being thereby kept in close abutting relation.

What is claimed is:

1. A drag harrow structure including a pair of harrow sections closely related at one of their ends, a draft attachment body of two related parts disposed adjacent the sections at their ends and hinged for movement vertically with respect to each other, two members, one each being pivotally attached to each of said parts of said body and located between the respective part and one of said harrow sections and adapted to swing thereon in a plane paralleling the planes of the harrow sections, each of said two related parts and its associated member being part of the draft structure through which draft is applied to said harrow sections, and independent means engaging each said member and its associated part of said body to lock the same against relative movement in a horizontal plane.

2. A drag harrow structure including a pair of harrow sections closely related at one of their ends, a draft attachment body of two related parts disposed adjacent the sections at their ends and hinged for movement vertically with respect to each other, two members each being pivotally attached to each of said parts of said body for relative movement in the plane of said harrow sections and each being located between its respective part and one of said harrow sections, and dual coupling means extending between each member and a harrow section, one of said dual coupling means being connected to a harrow section at a point adjacent the adjoining harrow section and the other of said dual coupling means being connected to the same harrow section at a point further removed from the adjoining harrow section.

3. A drag harrow structure including a pair of harrow sections closely related at one of their ends, a draft attachment body of two related parts disposed adjacent the sections at their ends and hinged for movement vertically with respect to each other, two members each being pivotally attached to each of said parts of said body for relative movement in the plane of said harrow sections and each being located between its respective part and one of said harrow sections, said two members including first coupling means extending from one of said parts to one of said harrow sections at a point adjacent the adjoining harrow section, and second coupling means extending from one of said parts to the same harrow section and being secured to the latter at a point further removed from the adjoining harrow section than said first mentioned point, and individual means engaging each of said parts and each respective member to lock the same against movement in the plane of said harrow sections.

4. A drag harrow structure including a pair of harrow sections closely related at one of their ends, a draft attachment body of two related parts disposed adjacent the sections at their ends and hinged for movement vertically with respect to each other, means interposed between and connecting one of said two parts to one of said harrow sections and comprising two rigid connections juxtaposed and pivotally mounted with respect to each other, and pivot means engaging both said rigid connections, one rigid connection being pivotally attached to one of said parts of said body and located between the respective part and one of said harrow sections and adapted to rock thereon in a plane paralleling the planes of the harrow sections, and the other of said two rigid connections being fixed to the same one of said harrow sections and pivotally mounted on the harrow end of said first of said two members for rocking in a vertical plane with respect thereto, said means and said members being part of the draft structure through which draft is applied to said harrow sections.

5. A drag harrow structure including a pair of harrow sections closely related at one of their ends, a draft attachment body of two related parts disposed adjacent the sections at their ends and hinged for movement vertically with respect to each other, means interposed between and connecting one of said two parts to one of said harrow sections and comprising two rigid connections juxtaposed and pivotally mounted with respect to each other, and pivot means engaging both said rigid connections, one rigid connection being pivotally attached to one of said parts of said body and located between the respective part and one of said harrow sections, and adapted to rock thereon in a plane paralleling the planes of the harrow sections, and the other of said two rigid connections being fixed to the same one of said harrow sections and pivotally mounted on the harrow end of said first of said two members for rocking in a vertical plane with respect thereto, said means and said members being part of the draft structure through which draft is applied to said harrow sections, and independent means engaging each said rigid connection and its associated part of said body to lock the same against relative movement in a horizontal plane.

6. A drag harrow structure including a pair of harrow sections closely related at one of their ends, a draft attachment body of two related parts disposed adjacent the sections at their ends and hinged for movement vertically with respect to each other, and two rigid connections juxtaposed and pivotally mounted with respect to each other, and pivot means engaging both said rigid connections, one rigid connection being pivotally attached to each of said parts of said body for rocking movement horizontally and its opposite end pivotally connected to a harrow section, whereby the latter may rock vertically with respect to that member, each of said two related parts and its associated member being a part of the draft structure through which draft is applied to said harrow sections.

References Cited in the file of this patent

UNITED STATES PATENTS

| | | |
|---|---|---|
| 1,051,835 | Fischer | Jan. 28, 1913 |
| 1,621,031 | Schmidt | Mar. 15, 1927 |
| 1,715,063 | Endres | May 28, 1929 |
| 2,582,750 | Donovan | Jan. 15, 1952 |